United States Patent [19]

Turk

[11] Patent Number: 5,024,682

[45] Date of Patent: Jun. 18, 1991

[54] CAUSTIC-IMPREGNATED ACTIVATED CARBONS FOR REMOVAL OF HYDROGEN SULFIDE

[75] Inventor: Amos Turk, Danbury, Conn.

[73] Assignee: J. Michael Brassey, Sherman, Conn.

[21] Appl. No.: 576,783

[22] Filed: Sep. 4, 1990

[51] Int. Cl.$^5$ .............................................. B01D 53/00
[52] U.S. Cl. ............................................ 55/73; 55/74; 423/230
[58] Field of Search ........................... 55/1, 73, 74, 97; 423/230

[56] References Cited

U.S. PATENT DOCUMENTS

| | | | |
|---|---|---|---|
| 4,072,479 | 2/1978 | Sinha et al. | 55/73 |
| 4,072,480 | 2/1978 | Wagner | 55/73 |
| 4,615,714 | 10/1986 | Turk et al. | 55/73 |

*Primary Examiner*—Jay H. Woo
*Assistant Examiner*—C. Scott Bushey

[57] ABSTRACT

In a process for removing hydrogen sulfide from an oxygen-containing gas stream by passing the gas stream through caustic-impreganted activated carbon, the stream containing from about 5 ppm to about 10,000 ppm by volume of hydrogen sulfide, improvement in which the breakthrough capacity of the caustic-impregnated activated carbon for hydrogen sulfide is extended by the addition of ammonia to the air stream at or about the time that the aforementioned breakthrough capacity has been reached or exceeded, the amount of added ammonia being such that its concentration is at least equal to the concentration of hydrogen sulfide but preferably not greater than about 50 ppm by volume.

5 Claims, No Drawings

CAUSTIC-IMPREGNATED ACTIVATED CARBONS FOR REMOVAL OF HYDROGEN SULFIDE

This invention relates to an improvement in the use of caustic-impregnated activated carbons for removal of hydrogen sulfide from oxygen-containing gas streams. It particularly relates to the extension of the breakthrough capacity of caustic-impregnated activated carbons for hydrogen sulfide by the addition of ammonia to the said gas streams at or about the time that the said breakthrough capacity of the caustic-impregnated activated carbon has been reached or exceeded.

BACKGROUND OF THE INVENTION

Since hydrogen sulfide has long been known to be a very toxic and malodorous gas, considerable efforts have been expended to develop methods for its removal from gas streams. Various common sources of hydrogen sulfide, such as sewage gases and the effluents from kraft pulp mills, also contain other odorous components, for which activated carbon is an effective purification medium. However, the breakthrough capacity of activated carbon for hydrogen sulfide is relatively low compared with its breakthrough capacity for most organic vapors, and for this reason the carbon is generally treated in some way to enhance its breakthrough capacity for hydrogen sulfide. One of the treatments involves the impregnation of the activated carbon with sodium hydroxide (caustic soda), as described in U.S. Pat. No. 4,072,479, or with potassium hydroxide (caustic potash).

Another method involves the addition of ammonia to the air stream containing the hydrogen sulfide prior to its passage through the unimpregnated activated carbon, as described in U.S. Pat. No. 4,615,714.

Although caustic impregnations bring about a significant increase in the breakthrough capacity of the carbon for hydrogen sulfide, any additional such capacity would be very desirable.

THE PRESENT INVENTION

It is, accordingly, an object of this invention to extend the breakthrough capacity of a caustic (NaOH or KOH) impregnated carbon for hydrogen sulfide present in gas streams containing oxygen, such as air streams.

Other objects will appear in the description that follows.

This invention provides an improvement in the process of using caustic-impregnated activated carbon for removing hydrogen sulfide from gas streams containing oxygen by the addition of ammonia to the said air stream at or about the time that the caustic-impregnated activated carbon has lost its effectiveness for the removal of hydrogen sulfide. Such loss of effectiveness is evidenced by "breakthrough" of hydrogen sulfide in the gas stream exiting from the carbon bed. "Breakthrough" (also called "breakpoint") is the first appearance in the effluent from a carbon bed of a particular gas or vapor under specified conditions. For example, a specified condition may be the perception of the odor of the gas or vapor in the effluent from the carbon bed. Another condition may be the appearance of the particular gas or vapor in the effluent at a specified concentration, such as, for example, 10 parts per million by volume. Still another condition may be the appearance of the gas or vapor at a specified percentage of the inlet concentration, such as, for example, its first appearance at a concentration of 5% of that of the inlet concentration. The "breakthrough capacity" of the carbon for hydrogen sulfide is the amount of hydrogen sulfide that has been removed from the gas stream passing through the carbon up to the time that breakthrough occurs. When such breakthrough occurs, the carbon must be discarded and replaced or somehow reactivated or regenerated so as to recover all or a large portion of its original capacity for removal of hydrogen sulfide. Reactivation, regeneration, or removal and replacement are all costly and time-consuming measures. Moreover, the purification of the gas stream is necessarily interrupted during such procedures unless a standby system is available, which is very costly.

I have found that the useful life of caustic-impregnated carbon whose breakthrough capacity for hydrogen sulfide in gas streams containing oxygen has been exhausted can be extended by a factor of at least 1.3 by the addition of ammonia to the said air stream at or about the time of breakthrough. The amount of added ammonia should be such that its concentration is at least equal to the concentration of hydrogen sulfide but preferably not greater than about 50 ppm by volume. Since the odor threshold of ammonia has been reported to be 47 ppm by volume (G. Leonardos, D. Kendall, and N. Bernard, J. Air Pollution Control Assn., Vol. 19, p. 91, 1969), this upper limit of 50 ppm will insure that the odor of ammonia in the effluent gas stream will be at most very slight or barely detectable. However, if there would be no objection to the odor of ammonia, larger concentrations of ammonia may be used.

The invention will become clearer from the examples that follow. These examples are given for illustration only, and are not to be considered as limiting.

EXAMPLE 1

A 100 lb sample of 6/8 mesh activated carbon was impregnated with 4.5 lb of potassium hydroxide, in the form of its aqueous solution, in a mechanical blender. In a laboratory test in which the carbon bed was challenged by a humidified air stream containing 10,000 ppm of hydrogen sulfide by volume until the the $H_2S$ concentration in the effluent stream reached 50 ppm, a representative sample of this material showed a breakthrough capacity for hydrogen sulfide of 0.12 g $H_2S$ per $cm^3$ of carbon. After this breakthrough occurred, the test was continued with the addition of 50 ppm by volume of ammonia gas to the air stream. Hydrogen sulfide breakthrough disappeared and did not reach 50 ppm again until the carbon had picked up an additional 0.04 g of $H_2S/cm^3$ of carbon, representing an extension of one third, which is a factor of 1.33, to its breakthrough capacity.

EXAMPLE 2

A sample of a granular activated carbon that had been impregnated with sodium hydroxide and loaded into a 12 ft-diameter vessel to a depth of 3 feet was taken from a probe inserted into the upstream portion of the said bed. The carbon in its vessel had been utilized for about two years for the purification of an odorous gas stream that contained hydrogen sulfide in concentrations up to about 15 ppm by volume, as well as other gases. The sample was tested in the laboratory under the conditions of Example 1 for its breakthrough capacity for hydrogen sulfide, which was found to be 0.02 g $H_2S/cm^3$ of carbon. This residual capacity was considered to be substantially exhausted since the original capacity of the carbon had been 0.14 g $H_2S/cm^3$ of carbon, and the loss was thus (0.14–0.02)/0.14, or 86%. The laboratory test was then continued with the addition of ammonia to the air stream as in Example 1. Hydrogen sulfide breakthrough disappeared and did not reappear at 50 ppm until the carbon had picked up a total of 0.11 g $H_2S/cm^3$ of carbon, which represented an additional 0.09 g $H_2S/cm^3$ of carbon, which is an extension of 0.09/0.14, or 64% of the its orginal breakthrough capacity.

EXAMPLE 3

A sample of a granular activated carbon that had been impregnated with potassium hydroxide and loaded into a 12 ft-diameter vessel to a depth of 3 feet was taken from a probe inserted into the upstream portion of the said bed. The carbon originally had a breakthrough capacity for hydrogen sulfide, as measured by the method described in Example 1, of 0.14 g $H_2S$ per $cm^3$ of carbon, and had been utilized for about two years for purification of an odorous gas stream that contained hydrogen sulfide in concentrations up to about 20 ppm by volume as well as other gases. The sample was tested in the laboratory under the conditions of Example 1, and its breakthrough capacity for hydrogen sulfide was found to be completely exhausted. The laboratory test was then continued with the addition of ammonia to the air stream as in Example 1, except that the concentration of ammonia in the challenge gas stream ranged between 7 and 10 ppm by volume. Hydrogen sulfide breakthrough disappeared and did not reappear at 50 ppm until the carbon had picked up a total of 0.19 g $H_2S/cm^3$ of carbon, which represented an extension of 0.19/0.14, or 136% of the its orginal breakthrough capacity.

I claim:

1. In a process for removing hydrogen sulfide from an oxygen-containing gas stream by passing said gas stream through caustic-impregnated activated carbon, said stream containing from about 5 ppm to about 10,000 ppm by volume of hydrogen sulfide, the improvement in which the breakthrough capacity of the caustic-impregnated activated carbon for hydrogen sulfide is extended by the addition of ammonia to said gas stream about the time of breakthrough.

2. A process according to claim 1 wherein the oxygen-containing gas stream is air.

3. A process according to claim 2 wherein the caustic impregnant is sodium hydroxide or potassium hydroxide.

4. A process according to claim 3 wherein the amount of added ammonia is such that its concentration is at least equal to the concentration of hydrogen sulfide.

5. A process according to claim 4 wherein the concentration of ammonia is not greater than 50 ppm by volume.

* * * * *